United States Patent
Fukui et al.

(10) Patent No.: US 10,718,280 B2
(45) Date of Patent: Jul. 21, 2020

(54) VAPORIZED FUEL TREATMENT DEVICE AND LEARNING METHOD OF VALVE OPENING START POSITION OF SEALING VALVE IN VAPORIZED FUEL TREATMENT DEVICE

(71) Applicants: TOYOTA JIDOSHA KABUSHIKI KAISHA, Toyota-shi, Aichi-ken (JP); AISAN KOGYO KABUSHIKI KAISHA, Obu-shi, Aichi-ken (JP)

(72) Inventors: Keita Fukui, Toyota (JP); Makoto Yamazaki, Toyota (JP); Yoshikazu Miyabe, Obu (JP)

(73) Assignees: Toyota Jidosha Kabushiki Kaisha, Toyota-shi, Aichi-ken (JP); Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 35 days.

(21) Appl. No.: 16/076,856

(22) PCT Filed: Jan. 19, 2017

(86) PCT No.: PCT/JP2017/001647
§ 371 (c)(1),
(2) Date: Aug. 9, 2018

(87) PCT Pub. No.: WO2017/138317
PCT Pub. Date: Aug. 17, 2017

(65) Prior Publication Data
US 2019/0063345 A1  Feb. 28, 2019

(30) Foreign Application Priority Data
Feb. 10, 2016  (JP) .................. 2016-023946

(51) Int. Cl.
*F02D 41/24* (2006.01)
*F02D 41/00* (2006.01)
(Continued)

(52) U.S. Cl.
CPC ....... *F02D 41/003* (2013.01); *F02D 41/2438* (2013.01); *F02D 41/2464* (2013.01);
(Continued)

(58) Field of Classification Search
CPC .............. F02D 41/003; F02D 41/2438; F02D 41/2464; F02D 41/004; F02D 41/0032;
(Continued)

(56) References Cited

U.S. PATENT DOCUMENTS

| | | | |
|---|---|---|---|
| 6,988,396 B2 * | 1/2006 | Matsubara | ......... F02M 25/0818 73/114.38 |
| 2001/0010219 A1 | 8/2001 | Isobe et al. | |

(Continued)

FOREIGN PATENT DOCUMENTS

| | | |
|---|---|---|
| JP | 2001-214817 | 8/2001 |
| JP | 2003-328867 | 11/2003 |

(Continued)

*Primary Examiner* — Mahmoud Gimie
*Assistant Examiner* — Joshua Campbell
(74) *Attorney, Agent, or Firm* — Finnegan, Henderson, Farabow, Garrett & Dunner, LLP

(57) ABSTRACT

A vaporized fuel treatment device includes a sealing valve disposed in a vapor passage between a fuel tank and a canister and is configured to include a valve element moves forward and backward in an axial direction to a valve seat, a cut-off valve configured to cut off a communication between the canister and an atmosphere, a tank internal pressure sensor detects an internal pressure of the fuel tank, and a canister internal pressure sensor that detects an internal pressure of the canister, a controller programmed to change an axial distance between the valve element and the (Continued)

valve seat in a state where the cut-off valve cuts off the communication between the canister and the atmosphere and to learn a valve opening start position of the sealing valve based on changes in the internal pressures of the fuel tank and the canister depending on a change in the axial distance.

4 Claims, 2 Drawing Sheets

(51) Int. Cl.
    *F02M 25/08*     (2006.01)
    *F02D 19/06*     (2006.01)
    *B60K 15/035*     (2006.01)

(52) U.S. Cl.
    CPC .......... *F02M 25/08* (2013.01); *F02M 25/089* (2013.01); *F02M 25/0836* (2013.01); *B60K 2015/03514* (2013.01); *F02D 19/0621* (2013.01); *F02D 41/004* (2013.01); *F02D 41/0032* (2013.01); *F02D 41/0037* (2013.01)

(58) Field of Classification Search
    CPC ............. F02D 41/0037; F02D 19/0621; B60K 2015/03514; F02M 25/08; F02M 25/0836; F02M 25/089
    USPC ........... 123/518–520, 516, 198 D; 73/114.39
    See application file for complete search history.

(56) References Cited

U.S. PATENT DOCUMENTS

| | | | |
|---|---|---|---|
| 2014/0102420 A1* | 4/2014 | Kimoto | F02M 25/0836 123/520 |
| 2014/0182360 A1* | 7/2014 | Horiba | G01M 3/2876 73/40.5 R |
| 2015/0122229 A1* | 5/2015 | Dudar | F02M 25/0818 123/518 |
| 2015/0159566 A1 | 6/2015 | Akita et al. | |
| 2015/0330338 A1 | 11/2015 | Ito | |

FOREIGN PATENT DOCUMENTS

| | | |
|---|---|---|
| JP | 2015-102012 | 6/2015 |
| JP | 2015-110914 | 6/2015 |
| JP | 2015-218659 | 12/2015 |

\* cited by examiner

VAPORIZED FUEL TREATMENT DEVICE AND LEARNING METHOD OF VALVE OPENING START POSITION OF SEALING VALVE IN VAPORIZED FUEL TREATMENT DEVICE

This is a national phase application of PCT/JP2017/1647 filed Jan. 19, 2017, claiming priority to Japanese Patent Application No. JP2016-23946 filed Feb. 10, 2016, the contents of which are incorporated herein by reference.

TECHNICAL FIELD

The present disclosure relates to a vaporized fuel treatment device with a sealing valve disposed in a vapor passage between a fuel tank and a canister and a learning method of a valve opening start position of the sealing valve in the vaporized fuel treatment device.

BACKGROUND

A conventionally known vaporized fuel treatment device includes a sealing valve that is driven by a stepper motor and controller that executes a learning of a valve opening start position of the sealing valve based on a change in an internal pressure of a fuel tank when changing an axial distance between a valve element and a valve seat of the sealing valve (as shown in, for example, Patent Literature 1). The controller of the vaporized fuel treatment device moves the valve element by a predetermined stroke at predetermined intervals from a valve closing limit position of the sealing valve and determines whether or not an internal pressure of the fuel tank decreases by a predetermined value or more with respect to a last detected value. Then, the controller judges that the sealing valve starts opening when determining that the internal pressure of the fuel tank decreases by the predetermined value or more with respect to the last detected value and calculates a learning value of the valve opening start position based on a total stroke from the valve closing limit position. Further, the controller determines whether or not an increase amount of the internal pressure of the fuel tank is permissible and interrupts or inhibits the learning of the valve opening start position when determining that the increase amount of the internal pressure of the fuel tank is not permissible during or before the learning.

CITATION LIST

Patent Literature

PTL1: Japanese Patent Application Laid Open No. 2015-110914

SUMMARY

A detected value of a sensor that detects the internal pressure of the fuel tank changes in accordance with both a vaporization state of fuel in the fuel tank and a behavior of a vehicle including the vaporized fuel treatment device or a behavior of fuel in the fuel tank. Thus, the learning of the valve opening start position of the sealing valve may be prohibited or interrupted after a start of the learning when the internal pressure (detected value) changes due to a change in the behavior of fuel in accordance with a movement of the vehicle. Therefore, it is difficult to accurately learn the valve opening start position when the vehicle is driven and there still remains problems in securing opportunities for the learning of the valve opening start position in the above conventional vaporized fuel treatment device.

A subject matter of the disclosure is to increase opportunities for the learning of the valve opening start position while favorably securing a learning accuracy of valve opening start position of the sealing valve.

The disclosure is directed to a vaporized fuel treatment device configured to include a sealing valve that is disposed in a vapor passage between a fuel tank and a canister and is configured to include a valve element that moves forward and backward in an axial direction with respect to a valve seat, a cut-off valve configured to cut off a communication between the canister and an atmosphere, a tank internal pressure sensor that detects an internal pressure of the fuel tank, and canister internal pressure sensor that detects an internal pressure of the canister. The vaporized fuel treatment device is configured to further include a controller that controls the sealing valve and the cut-off valve. The controller is programmed to change an axial distance between the valve element and the valve seat in a state where the cut-off valve cuts off the communication between the canister and the atmosphere. Further, the controller is programmed to learn a valve opening start position of the sealing valve based on changes in the internal pressures of the fuel tank and the canister depending on a change in the axial distance.

In the vaporized fuel treatment device, the internal pressure of the fuel tank decreases and the internal pressure of the canister increases when the sealing valve is opened in accordance with the change in the axial distance between the valve element and the valve seat in a state where the internal pressure of the fuel tank is a positive pressure and the cut-off valve cuts off the communication between the canister and the atmosphere. On the other hand, the internal pressure of the fuel tank increases and the internal pressure of the canister decreases when the sealing valve is opened in accordance with the change in the axial distance in a state where the internal pressure of the fuel tank is a negative pressure and the cut-off valve cuts off the communication between the canister and the atmosphere. Further, a behavior of fuel in the fuel tank has a very small effect on a detected value of the canister internal pressure sensor in a state where the communication between the canister and the atmosphere is cut off and the sealing valve is opened. Thus, the axial distance is changed in the state where the communication between the canister and the atmosphere is cuts off and the valve opening start position of the sealing valve is learned based on changes in the internal pressures of the fuel tank and the canister. This configuration allows a learning of the valve opening start position while reducing an erroneous learning due to a change in a detected value of the tank internal pressure sensor depending on a change in the behavior of fuel in the fuel tank when the behavior of the fuel in the fuel tank changes, for example, when a vehicle equipped with the vaporized fuel treatment device is driven. Accordingly, the vaporized fuel treatment device enables opportunities for the learning of the valve opening start position to be increased while favorably securing a learning accuracy of valve opening start position of the sealing valve.

The controller may be programmed to store a command value of the axial distance as a learning value of the valve opening start position when an absolute value of an amount of change in the internal pressure of the fuel tank depending on the change in the axial distance is equal to or larger than a predetermined tank internal pressure threshold value and an absolute value of an amount of change in the internal pressure of the canister depending on the change in the axial distance is equal to or larger than a predetermined canister internal pressure threshold value.

The controller may be programmed to execute a learning of the valve opening start position when the internal pressure of the fuel tank is equal to or smaller than a first threshold value that is smaller than a standard atmospheric pressure and when the internal pressure of the fuel tank is equal to or larger than a second threshold value that is larger than the standard atmospheric pressure.

The disclosure is further directed to a learning method of a valve opening start position of a sealing valve in a vaporized fuel treatment device configured to include the sealing valve that is disposed in a vapor passage between a fuel tank and a canister and is configured to include a valve element that moves forward and backward in an axial direction with respect to a valve seat, a cut-off valve configured to cut off a communication between the canister and an atmosphere, a tank internal pressure sensor that detects an internal pressure of the fuel tank, and a canister internal pressure sensor that detects an internal pressure of the canister. The method includes: changing an axial distance between the valve element and the valve seat in a state where the cut-off valve cuts off the communication between the canister and the atmosphere, and learning a valve opening start position of the sealing valve based on changes in the internal pressures of the fuel tank and the canister depending on a change in the axial distance.

The method enables opportunities for the learning of the valve opening start position to be increased while favorably securing a learning accuracy of valve opening start position of the sealing valve.

DESCRIPTION OF EMBODIMENTS

The following describes some embodiments of the disclosure with reference to drawings.

Figure 1:
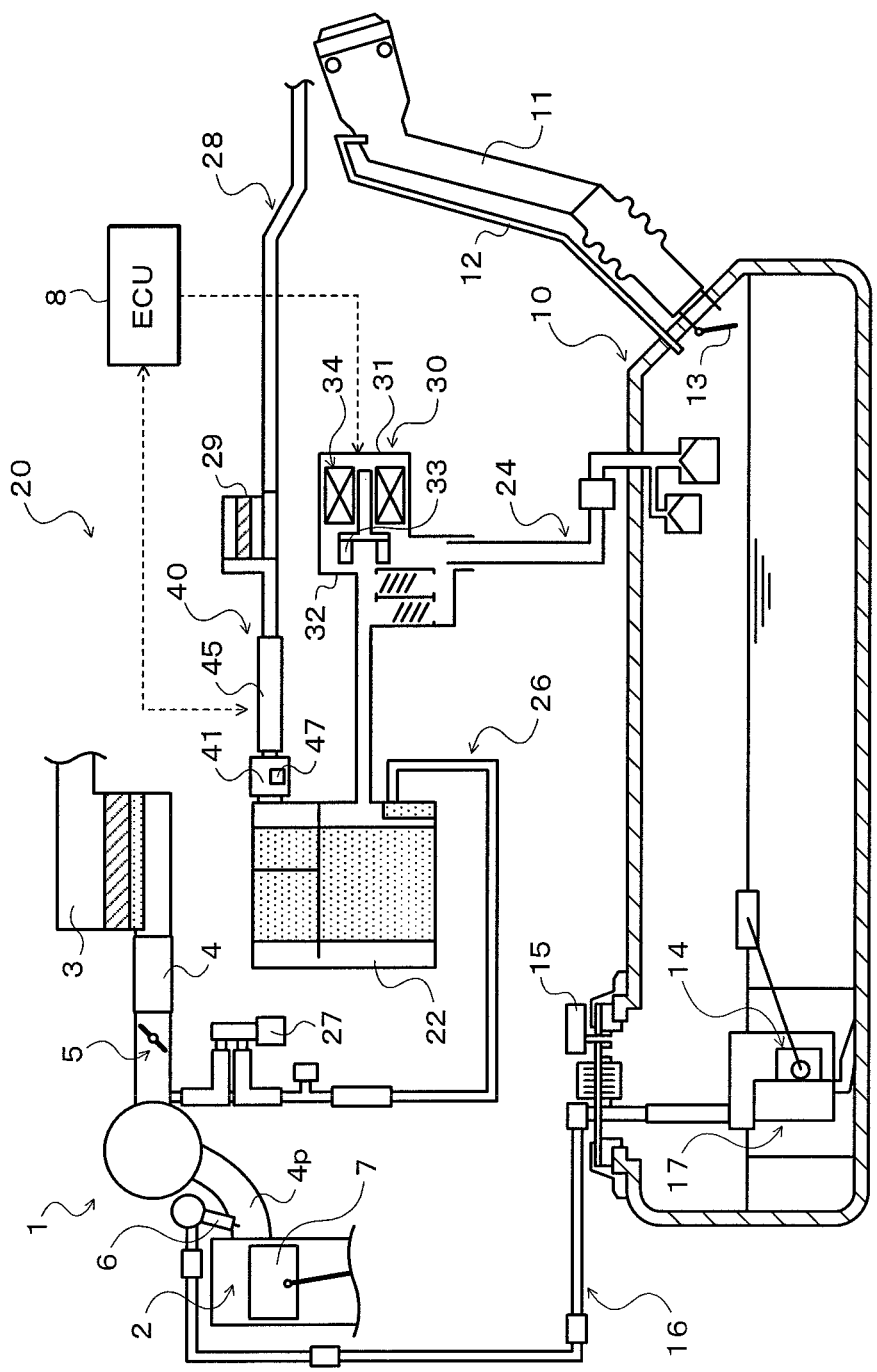
FIG. 1 is a schematic configuration diagram illustrating a vaporized fuel treatment device according to the disclosure.

FIG. 1 is a schematic configuration diagram illustrating a vaporized fuel treatment device 20 according to the disclosure. The vaporized fuel treatment device 20 illustrated in FIG. 1 is configured to prevent vaporized fuel generated in a fuel tank 10 storing fuel that is supplied to combustion chambers 2 of an engine (internal combustion engine) 1 mounted in a vehicle (not shown) from leaking outside of the fuel tank 10. In the engine 1, air cleaned by an air cleaner 3 is taken into each of the combustion chambers 2 via an intake pipe 4, a throttle valve 5, intake valves (not shown) and the like. The fuel is injected to the intake air by fuel injection valves 6 in either inlet ports 4p or the combustion chamber 2. Air-fuel mixture is ignited with spark generated by a spark plug (not shown) and is explosively combusted in the combustion chambers 2 so as to reciprocatingly move pistons 7. The engine 1 is controlled by an electric control unit (hereinafter referred to as "ECU") 8 that includes a microcomputer with a CPU and the like (not shown). The vehicle with the engine 1 may be either a vehicle that includes only the engine 1 as a power source generating power for driving or a hybrid vehicle that includes a motor generating power for driving in addition to the engine 1.

The fuel tank 10 is configured to include a fuel inlet pipe 11 for supplying the fuel to the fuel tank 10 via a fuel filler (not shown) of the vehicle, a vent line 12, a check valve 13 that regulates the fuel from flowing back from the fuel tank 10 to the fuel filler, a fuel sender gauge 14 that detects a surface level of the fuel in the fuel tank 10 by means of a float, a tank internal pressure sensor 15 that detects an internal pressure Ptk of the fuel tank 10 and the like. The fuel sender gauge 14 and the tank internal pressure sensor 15 respectively send a signal indicating a detected value to the ECU 8. A fuel passage 16 is connected to an upper portion of the fuel tank 10 and a fuel pump module 17 is disposed in the fuel tank 10. The fuel pump module 17 is controlled by the ECU 8 and is connected to the fuel passage 16. The fuel is pressurized by the fuel pump module 17 so as to be supplied to the fuel injection valves 6 of the engine 1 via the fuel passage 16.

As shown in FIG. 1, the vaporized fuel treatment device 20 is configured to include a canister 22, a vapor passage 24 connecting the fuel tank 10 and the canister 22, a purge passage 26, atmosphere passage 28 and a sealing valve 30 disposed in the middle of the vapor passage 24. The canister 22 includes an active charcoal or an absorbent disposed therein so as to absorb the vaporized fuel in the fuel tank 10 by means of the active charcoal. One end portion (upstream side end portion) of the vapor passage 24 is connected to the fuel tank 10 so as to communicate with a gaseous layer in the fuel tank 10. The other end portion (downstream side end portion) of the vapor passage 24 is connected to the canister 22 so as to communicate with the inside of the canister 22.

One end portion (upstream side end portion) of the purge passage 26 is connected to the canister 22 so as to communicate with the inside of the canister 22. The other end portion (downstream side end portion) of the purge passage 26 is connected to the intake pipe 4 at a downstream side of the throttle valve 5 of the engine 1. A purge valve 27 capable of cutting off the purge passage 26 is disposed in the middle of the purge passage 26. The purge valve 27 is an on-off valve that is controlled by the ECU 8 and is normally maintained in a close state. Further, one end portion of the atmosphere passage 28 is connected to the canister 22 via key-off pump module 40 or a diagnostic equipment that is used for a fault diagnosis of the vaporized fuel treatment device 20. The key-off pump module 40 is configured to include a switching valve 41 that is an on-off valve (cut-off valve) controlled by the ECU 8, a vacuum pump (pressure reduction pump) 45 controlled by the ECU 8 and a canister internal pressure sensor 47 that detects an internal pressure Pc of the canister 22 and sends the detected internal pressure Pc to the ECU 8. The switching valve 41 allows a communication between the inside of the canister 22 and the atmosphere passage 28 in an open state and cuts off the communication between the inside of the canister 22 and the atmosphere passage 28 in a close state. The vacuum pump 45 is capable of reducing the internal pressure of the canister 22 (generating a negative pressure in the canister 22) when the switching valve 41 is closed. Further, an air filter 29 is disposed in the middle of the atmosphere passage 28 and the other end portion of the atmosphere passage 28 is opened to the atmosphere.

The sealing valve 30 is a flow control valve that is controlled by the ECU 8. The sealing valve 30 seals the vapor passage 24 in a close state so as to cut off the communication between the canister 22 and the atmosphere passage 28. The sealing valve 30 regulates a flow rate of vapor flowing in the vapor passage 24 in an open state. The sealing valve 30 is configured to include casing 31, a valve seat 32 formed in the casing 31, a valve element 33 disposed in the casing 31 so as to be movable in an axial direction, and stepper motor 34 disposed in the casing 31 and connected to the valve element 33 via a valve guide (not shown). The stepper motor 34 is controlled by the ECU 8 and allows the valve element 33 to move forward and backward in the axial direction with respect to a valve seat 32. When the valve element 33 approaches the valve seat 32 in accordance with an operation of the stepper motor 34, a seal member (not shown) of the valve element 33 contacts with the valve seat 32 so as to close the sealing valve 30. When the valve element 33 moves away from the valve seat 32 in accordance with the operation of the stepper motor 34, the seal member of the valve element 33 moves away from the valve seat 32 so as to open the sealing valve 30.

In the above vaporized fuel treatment device 20, the sealing valve 30 is maintained in the close state when the vehicle is parked (when an operation of the engine 1 is stopped) so that the vaporized fuel in the fuel tank 10 dose not flow into the canister 22. When the vehicle is parked, the purge valve 27 is closed so as to maintain the purge passage 26 in a cut-off state and the switch valve 41 is opened so as to maintain the communication between the canister 22 and the atmosphere passage 28. Further, in the vaporized fuel treatment device 20, the ECU 8 is programmed to diagnose whether or not a leakage occurs in the vapor passage 24 and the purge passage 26 during a Key-off period of the vehicle in which an ignition switch (start switch) is turned off (the operation of the engine 1 is stopped).

When a predetermined learning execution condition is satisfied after the ignition switch is turned on, a learning of a valve opening start position of the sealing valve 30 is executed based on a change in the internal pressure of the fuel tank 10 when changing an axial distance between the valve element 33 and the valve seat 32. The ECU 8 opens the purge valve 27 while maintaining the communication between the inside of the canister 22 and the atmosphere passage 28 when the vehicle is driven and a predetermined purge condition is satisfied. As a result, an intake negative pressure of the engine 1 (intake pipe 4) is introduced into the canister 22 via the purge passage 26 so that air flows into the canister 22 from the atmosphere passage 28. Further, the ECU 8 opens the sealing valve 30 so as to release the internal pressure of the fuel tank 10 when the purge valve 27 is opened and the internal pressure Ptk of the fuel tank 10 is equal to or more than a predetermined value. As a result, the vapor (vaporized fuel) in the fuel tank 10 flows into the canister 22 via the vapor passage 24 (sealing valve 30). The absorbent of the canister 22 is purged by the air flowing into the canister 22 and the like. The vaporized fuel desorbed from the absorbent is introduced to the intake pipe 4 of the engine 1 together with air and is combusted in the combustion chambers 2.

Figure 2:
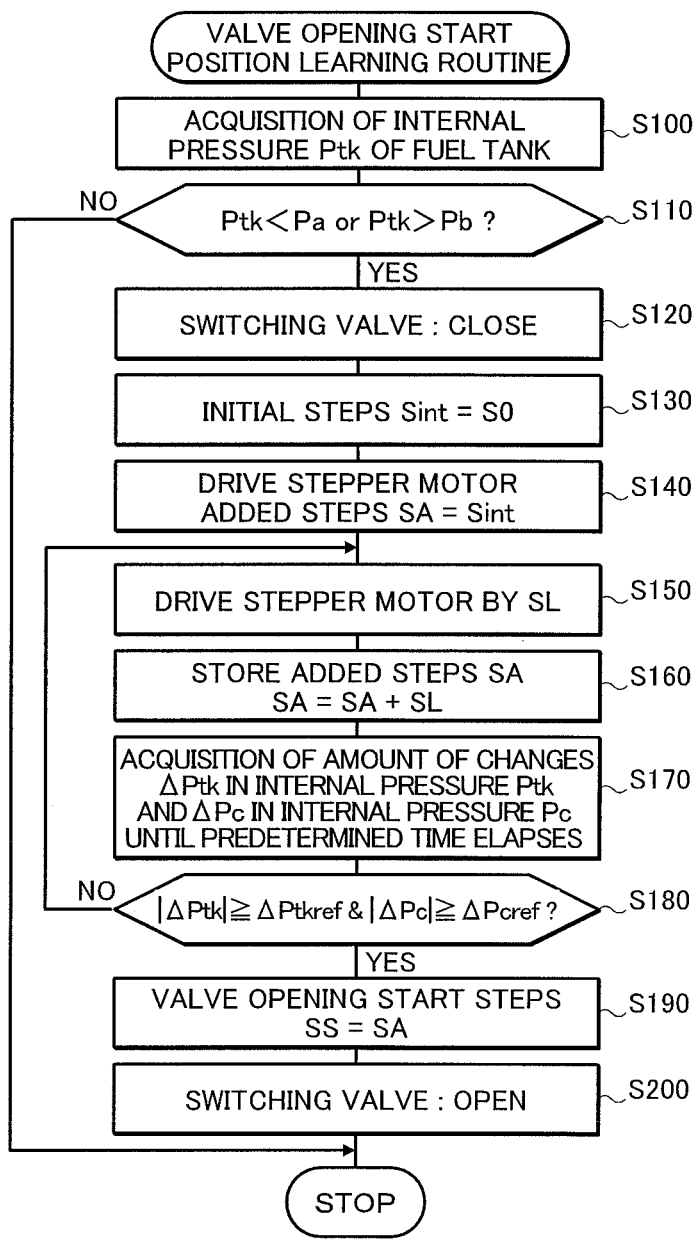
FIG. 2 is a flowchart exemplifying a valve opening start position learning routine executed in the vaporized fuel treatment device according to the disclosure.

The following describes a learning procedure of the valve opening start position of the sealing valve 30 in the vaporized fuel treatment device 20 with reference to FIG. 2. FIG. 2 is a flowchart exemplifying a valve opening start position learning routine executed by the ECU 8.

In the embodiment, the valve opening start position learning routine of FIG. 2 is executed when a predetermined timing arrives, for example, when the vehicle is stopped. As shown in FIG. 2, the ECU 8 (CPU not shown) acquires the internal pressure Ptk of the fuel tank 10 detected by the tank internal pressure sensor 15 at the start of the valve opening start position learning routine (Step S100). Then, the ECU 8 determines whether or not the internal pressure Ptk of the fuel tank 10 is equal to or smaller than a first threshold value Pa that is smaller than a standard atmospheric pressure or the internal pressure Ptk is equal to or larger than a second threshold value Pb that is larger than the standard atmospheric pressure (Step S110). When determining that the internal pressure Ptk is larger than the first threshold value Pa and smaller than the second threshold value Pb at Step S110, the ECU 8 judges that an execution condition of the learning of the valve opening start position is not satisfied and terminates the routine.

When determining that the internal pressure Ptk is equal to or smaller than the first threshold value Pa or is equal to or larger than the second threshold value Pb at Step S110, the ECU 8 judges that the execution condition of the learning of the valve opening start position is satisfied and closes the switching valve 41 of the key-off pump module 40 (Step S120). As a result, the internal pressure Pc of the canister 22 is not affected by the atmosphere and changes in accordance with a state of sealing valve 30 or the actual internal pressure Ptk of the fuel tank 10 because the communication between the inside of the canister 22 and the atmosphere (atmosphere passage 28) is cut off. On this occasion, the purge valve 27 is maintained in the close state. Further, in a state where the switching valve 41 is closed and sealing valve 30 is opened, a behavior of fuel in the fuel tank 10 has a very small effect on a detected value of the canister internal pressure sensor 47 that detects the internal pressure Pc of the canister 22.

After the Step S120, the ECU 8 sets initial steps Sint that is an initial command value to the stepper motor 34 of the sealing valve 30 to a predetermined limit valve closing steps S0 (Step S130). The limit valve closing steps S0 is predetermined as required steps of the stepper motor 34 (a command value of the axial distance between the valve element 33 and the valve seat 32) to move the valve element 33 from a position where the sealing valve 30 is fully closed to a position where the valve element 33 still contacts with the valve seat 32 just before the sealing valve 30 is opened. Further, the ECU 8 controls the stepper motor 34 so that a rotor of the stepper motor 34 rotates (at high speed) by the set initial steps Sint and stores the initial steps Sint in the RAM as the added steps. SA (Step S140). The added steps SA is equivalent to a command value of the axial distance between the valve element 33 and the valve seat 32, which has been used for controlling the stepper motor 34.

Next, the ECU 8 controls the stepper motor 34 so that the rotor of the stepper motor 34 rotates by predetermined learning steps SL (for example, several steps) at Step S150. Further, the ECU 8 stores the sum of the added steps SA at the time and the learning steps SL in the RAM as the new added steps SA (Step S160). Then, the ECU 8 acquires (calculates) an amount of change $\Delta Ptk$ in the internal pressure Ptk of the fuel tank 10 and an amount of change $\Delta Pc$ in the internal pressure Pc of the canister 22 until a predetermined time (for example, several hundred milliseconds) elapses after the rotor is rotated by the learning steps SL, based on the internal pressure Ptk of the fuel tank 10 detected by the tank internal pressure sensor 15 and the internal pressure Pc of the canister 22 detected by the canister internal pressure sensor 47 (Step S170). Then, the ECU 8 determines whether or not an absolute value of the amount of change $\Delta Ptk$ is equal to or larger than a predetermined threshold value $\Delta Ptkref$ (positive value) and an absolute value of the amount of change $\Delta Pc$ is equal to or larger than a predetermined threshold value $\Delta Pcref$ (positive value) at Step S180.

Here, when the sealing valve 30 is opened in accordance with a change in the axial distance between the valve element 33 and the valve seat 32 in a state where the internal pressure Ptk of the fuel tank 10 is a positive pressure (Ptk>atmospheric pressure) and the switching valve 41 cuts off the communication between the canister 22 and the atmosphere, gas in the fuel tank 10 flows into the canister 22, so that the internal pressure Ptk of the fuel tank 10 decreases and the internal pressure Pc of the canister 22 increases. When the sealing valve 30 is opened in accordance with the change in the axial distance in a state where the internal pressure Ptk of the fuel tank 10 is a negative pressure (Ptk<atmospheric pressure) and the switching valve 41 cuts off the communication between the canister 22 and the atmosphere, on the other hand, gas in the canister 22 flows into the fuel tank 10, so that the internal pressure Ptk of the fuel tank 10 increases and the internal pressure Pc of the canister 22 decreases.

Based on this, when determining that the absolute value of the amount of change ΔPtk is equal to or larger than the threshold value ΔPtkref and the absolute value of the amount of change ΔPc is not equal to or larger than the predetermined threshold value ΔPcref at Step S180, the ECU 8 judges that the sealing valve 30 does not start opening so that the internal pressure Ptk of the fuel tank 10 and the internal pressure Pc of the canister 22 do not substantially change and executes processes of and after Step S150 again. When determining that the absolute value of the amount of change ΔPtk is equal to or larger than the threshold value ΔPtkref and the absolute value of the amount of change ΔPc is equal to or larger than the predetermined threshold value ΔPcref at Step S180, on the other hand, the ECU 8 judges that the sealing valve 30 starts opening so that the internal pressure Ptk of the fuel tank 10 and the internal pressure Pc of the canister 22 substantially change and stores the added steps SA stored in the RAM at the time as a valve opening start steps SS that is a learning value of the valve opening start position in the RAM (Step S190). Then, the ECU 8 closes the switching valve 41 (Step S200) and terminates the routine.

As described above, the ECU 8 or the controller of the vaporized fuel treatment device 20 learns the valve opening start position of the sealing valve 30 based on changes in the internal pressures of the fuel tank 10 and the canister 22 while changing the axial distance between the valve element 33 and the valve seat 32 by a distance corresponding to the learning steps SL in the state where the switching valve 41 cuts off the communication between the canister 22 and the atmosphere (Steps S120-S190). That is, the ECU 8 executes the learning of the valve opening start position of the sealing valve 30 while considering the change in the internal pressure Pc of the canister 22 that is not substantially affected by a change in the behavior of fuel in the fuel tank 10 in addition to the change in the internal pressure Ptk of the fuel tank 10. This configuration allows the learning of the valve opening start position while reducing an erroneous learning due to a change in a detected value of the tank internal pressure sensor 15 depending on the change in the behavior of fuel in the fuel tank 10 when the behavior of the fuel in the fuel tank 10 changes, for example, when the vehicle equipped with the vaporized fuel treatment device 20 is driven. Further, this configuration reduces an interruption of the learning of the valve opening start position of the sealing valve 30 due to a start of the vehicle after the learning is started while the vehicle is stopped. Accordingly, the vaporized fuel treatment device 20 enables opportunities for the learning of the valve opening start position to be increased while favorably securing learning accuracy of valve opening start position of the sealing valve 30.

As has been described above, the vaporized fuel treatment device 20 of the disclosure is configured to include the sealing valve 30 that is disposed in the vapor passage 24 between the fuel tank 10 and the canister 22 and is configured to include the valve element 33 that moves forward and backward in the axial direction with respect to the valve seat 32, the switching valve 41 configured to cut off the communication between the canister 22 and the atmosphere, the tank internal pressure sensor 15 that detects the internal pressure Ptk of the fuel tank 10, the canister internal pressure sensor 47 that detects the internal pressure Pc of the canister 22, and the ECU 8 that controls the sealing valve 30 and the switching valve 41. The ECU 8 or the controller is programmed to change the axial distance between the valve element 33 and the valve seat 32 in the state where the switching valve 41 cuts off the communication between the canister 22 and the atmosphere and to learn the valve opening start position of the sealing valve 30 based on changes in the internal pressures of the fuel tank 10 and the canister 22 depending on the change in the axial distance (Steps S120-S190). Accordingly, the vaporized fuel treatment device 20 enables opportunities for the learning of the valve opening start position to be increased while favorably securing the learning accuracy of valve opening start position of the sealing valve 30.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The techniques according to the disclosure is applicable to, for example, the field of manufacture of the vaporized fuel treatment device.

The invention claimed is:

1. A vaporized fuel treatment device configured to include a sealing valve that is disposed in a vapor passage between a fuel tank and a canister and is configured to include a valve element that moves forward and backward in an axial direction with respect to a valve seat, a cut-off valve configured to cut off a communication between the canister and an atmosphere, a tank internal pressure sensor that detects an internal pressure of the fuel tank, and a canister internal pressure sensor that detects an internal pressure of the canister, the vaporized fuel treatment device comprising:
a controller programmed to:
control opening and closing of the sealing valve and the cut-off valve,
change an axial distance between the valve element and the valve seat in a state where the cut-off valve cuts off the communication between the canister and the atmosphere, and
conduct a sealing valve opening start position learning routine comprising:
setting an initial command value to rotate a stepper motor of the sealing valve a predetermined number of initial steps to move the sealing valve from a position where the sealing valve is fully closed to a position just before the sealing valve is opened,
storing the number of initial steps of the stepper motor as added steps, controlling the stepper motor of the sealing valve to rotate a predetermined number of learning steps to move the sealing valve to an open position, storing a sum of the number of initial steps and the number of learning steps as a number of new added steps of the stepper motor, and learning a valve opening start position of the sealing valve based on changes in the internal pressures of the fuel tank and the canister depending on a change in the axial distance caused by rotating the stepper motor by the number of learning steps and waiting for a predetermined time to elapse after rotating the stepper motor by the number of learning steps before determining the changes in the internal pressures of the fuel tank and the canister.

2. The vaporized fuel treatment device according to claim 1, wherein the controller is programmed to store a command value of the axial distance caused by rotating the stepper motor by the number of learning steps as a learning value of the valve opening start position when an absolute value of an amount of change in the internal pressure of the fuel tank depending on the change in the axial distance is equal to or larger than a predetermined tank internal pressure threshold value and an absolute value of an amount of change in the internal pressure of the canister depending on the change in the axial distance is equal to or larger than a predetermined canister internal pressure threshold value.

3. The vaporized fuel treatment device according to claim 1, wherein the controller is programmed to execute a learning of the valve opening start position when the internal pressure of the fuel tank is equal to or smaller than a first threshold value that is smaller than a standard atmospheric pressure and when the internal pressure of the fuel tank is equal to or larger than a second threshold value that is larger than the standard atmospheric pressure.

4. A learning method of a valve opening start position of a sealing valve in a vaporized fuel treatment device configured to include the sealing valve that is disposed in a vapor passage between a fuel tank and a canister and is configured to include a valve element that moves forward and backward in an axial direction with respect to a valve seat, a cut-off valve configured to cut off a communication between the canister and an atmosphere, a tank internal pressure sensor that detects an internal pressure of the fuel tank, and a canister internal pressure sensor that detects an internal pressure of the canister, the method comprising:

changing an axial distance between the valve element and the valve seat in a state where the cut-off valve cuts off the communication between the canister and the atmosphere, setting an initial command value to rotate a stepper motor of the sealing valve a predetermined number of initial steps to move the sealing valve from a position where the sealing valve is fully closed to a position just before the sealing valve is opened, storing the number of initial steps of the stepper motor as added steps, controlling the stepper motor of the sealing valve to rotate a predetermined number of learning steps to move the sealing valve to an open position, storing a sum of the number of initial steps and the number of learning steps as a number of new added steps of the stepper motor, and learning a valve opening start position of the sealing valve based on changes in the internal pressures of the fuel tank and the canister depending on a change in the axial distance caused by rotating the stepper motor by the number of learning steps and waiting for a predetermined time to elapse after rotating the stepper motor by the number of learning steps before determining the changes in the internal pressures of the fuel tank and the canister.

* * * * *